United States Patent [19]
Dreyer

[11] 3,914,016
[45] Oct. 21, 1975

[54] PRODUCTION OF GRADIENT DENSITY LIQUID CRYSTAL FILTER

[75] Inventor: John F. Dreyer, Cincinnati, Ohio

[73] Assignee: Minnesota Mining and Manufacturing Company, St. Paul, Minn.

[22] Filed: Nov. 26, 1974

[21] Appl. No.: 527,205

Related U.S. Application Data

[63] Continuation-in-part of Ser. No. 348,943, April 9, 1973, abandoned.

[52] U.S. Cl. .......... 350/155; 117/33.3; 350/160 LC; 350/314
[51] Int. Cl.² .................. G02B 5/30; G02B 5/22; C03C 17/28
[58] Field of Search ..... 350/154, 155, 148, 160 LC, 350/311, 314, 316; 117/33.3

[56] References Cited
UNITED STATES PATENTS

| | | | |
|---|---|---|---|
| 2,475,921 | 7/1949 | Smith | 350/155 |
| 2,544,659 | 3/1951 | Dreyer | 350/154 |
| 3,354,025 | 11/1967 | Aykanian et al. | 350/314 UX |
| 3,679,297 | 7/1972 | Searle et al. | 350/316 |

*Primary Examiner*—Ronald J. Stern
*Attorney, Agent, or Firm*—Melville, Strasser, Foster & Hoffman

[57] ABSTRACT

The production of a gradient density polarizing filter by applying a solvent solution of dichroic substance capable of existing in the nematic liquid crystal phase to a directionally oriented light transmissive supporting surface so as to form a coating of solvent solution thereon, the concentration of the dichroic substance in the solvent solution being selectively varied during application of the solvent solution to different areas of the supporting surface, whereupon the solvent is evaporated to bring the dichroic substance into its nematic phase with the direction of orientation of its molecules controlled by the orientation of the supporting surface, the light transmissive properties of the polarizer so formed varying in a smooth gradient in accordance with the concentration of the dichroic substance applied to the supporting surface.

14 Claims, 6 Drawing Figures

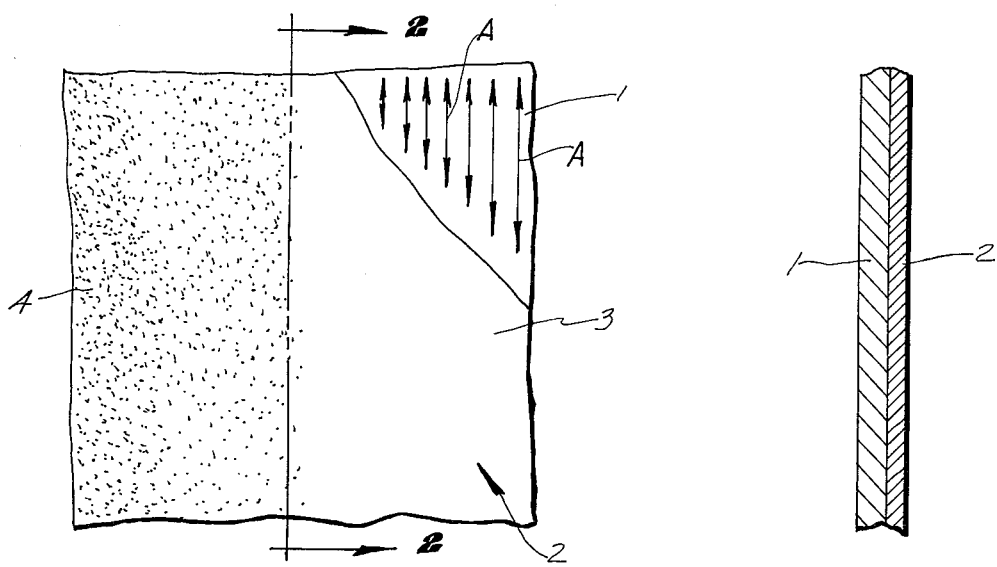
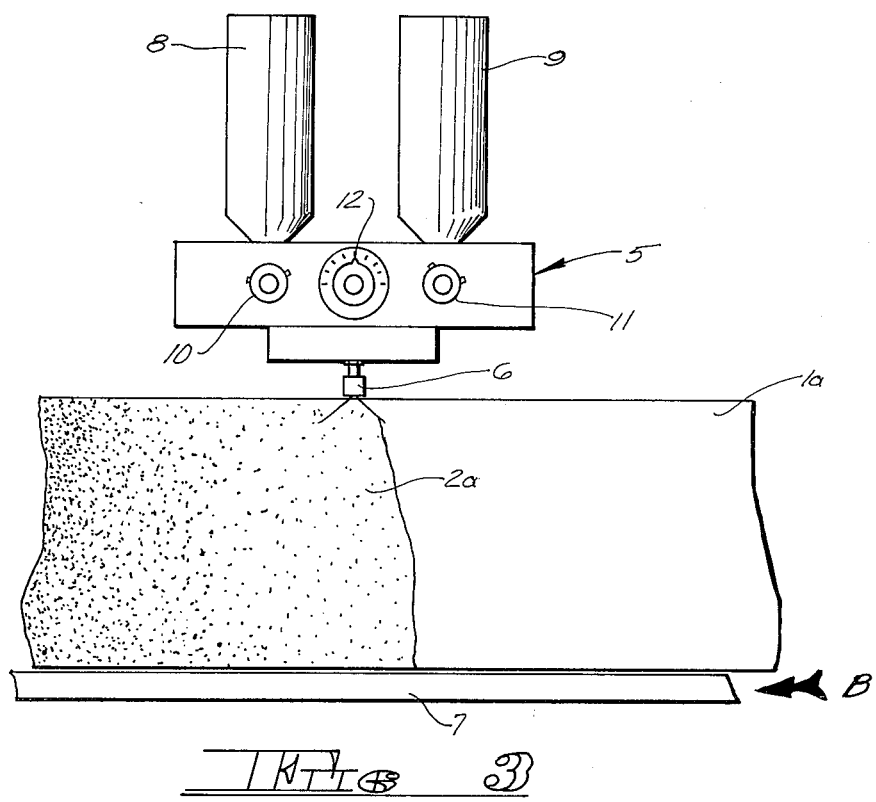

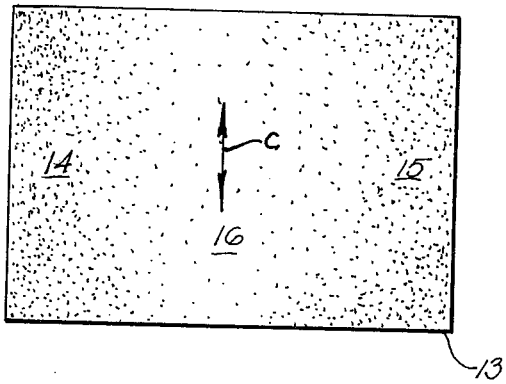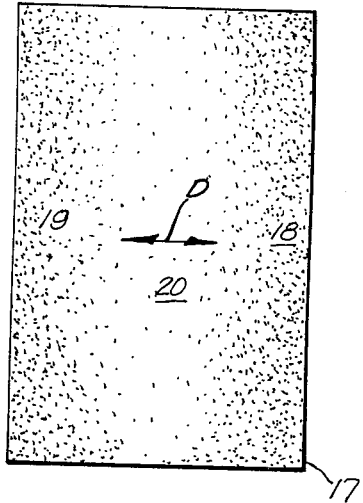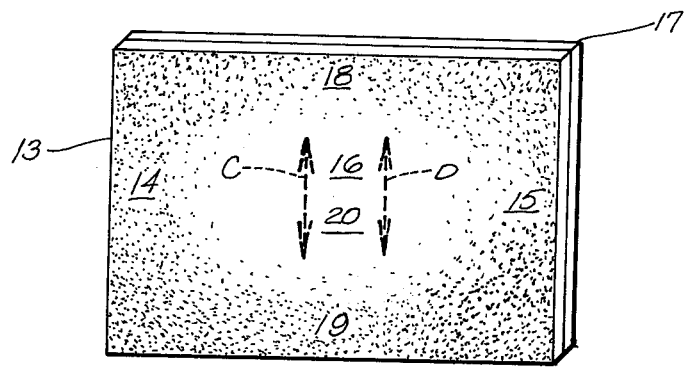

PRODUCTION OF GRADIENT DENSITY LIQUID CRYSTAL FILTER

CROSS-REFERENCE TO RELATED APPLICATION

This is a continuation-in part of application Ser. No. 348,943, filed Apr. 9, 1973, entitled "Production of Gradient Density Filter" and now abandoned.

BACKGROUND OF THE INVENTION

1. Field of the Invention

This invention relates to the production of oriented light polarizing filters, and relates more particularly to a gradient density polarizing filter wherein the light transmissive characteristics of the filter are varied in a smooth gradient from surface area to surface area within the confines of the filter.

2. Description of the Prior Art.

Constant density polarizers have been known in the art for some time, as have non-polarizing gradient density filters, but to date there has been no practical procedure for producing a gradient density polarizing filter. The present invention constitutes an improvement of the optical devices and procedures taught in the present inventor's U.S. Pat. Nos. 2,400,877 and 2,544,659. The former patent teaches the production of an optical element comprising a transparent support having a non-crystalline molecular coating of individually oriented molecules of a dichroic substance on one surface thereof, the direction of orientation of the molecules being controlled by subjecting the dichroic substance to an oriented field. The latter patent teaches various mixtures of dichroic dye solutions which may be employed to produce the desired coating, together with techniques for applying the solutions. The present inventor's U.S. Pat. No. 2,481,830 is also pertinent in that it teaches how such coatings may be stabilized and preserved without disturbing the molecular orientation of the dichroic material.

While the foregoing patents teach the provision of polarizing films, they do not deal with variable light transmissability or the production of true gradient density filters, nor was it heretofore appreciated that the light transmissive characteristics of such films could be effectively varied over their surface in a smooth gradient by varying the concentration of the dichroic solution utilized to form the films, thereby providing a predetermined density pattern. U.S. Pat. No. 2,544,659 teaches, for example, that the dichroic solution may be applied by a dipping method, and that the final thickness of the coating will be directly related to the speed of removal of the substrate from the solution. While the thickness of the coating and hence the optical density of the resulting dichroic film may be varied within limits, depending primarily on surface tension, the thickness of the applied coating will be substantially uniform at a given speed of withdrawal, the slower the speed the thicker the coating. However, if the speed of removal of the substrate is varied to alter the thickness of the coating from one area to the next, sharp lines of demarcation result, producing a step-like or striped effect which is highly undesirable in a true gradient density filter wherein the transition must be smooth and free from visually preceptible lines of demarcation as the optical density of the filter changes.

RESUME OF THE INVENTION

A principal use for a gradient density polarizing filter is in an automobile windshield visor which may be adjustably positioned in front of the driver with the area of highest light transmission directly in front of the driver's eyes and with lower levels of light transmission above the horizon and below the driver's normal line of sight, i.e., below about 20 feet in front of the vehicle. Similarly the light transmissive character of the visor may be reduced both to the far right and far left of the normal viewing area. Such a visor will provide maximum visibility in the normal viewing areas, and yet allow reduction of glare and interfering light from other areas, with a gradual shift in light transmission so that movement of the viewer's line of sight does not result in an abrupt change in light transmission or give a disturbing cutoff of the driver's view, as is the case with conventional opaque visors. Yet by moving his head, the driver can effectively utilize that portion of the visor's viewing area which best suits his needs under any given driving condition.

There are numerous other uses for gradient density polarizing filters, for example, as a camera filter, or as a windowpane where natural outdoor light above the horizon is excessive yet useful and an abrupt change in transmission would have a disturbing effect on persons working near the window. The present invention will permit gradient density filters, whether they be in the form of windowpanes, windshields, visors, or the like, to be formed with any desired range of light transmissive characteristics arranged as desired throughout the viewing area of the filter.

Polarizing films in accordance with the invention are produced by evaporating from solvent solution a dichroic substance capable of existing in the nematic liquid crystal phase upon an oriented transparent surface or substrate. The term dichroic as used herein denotes the property of the molecules to exhibit different light absorption characteristics when viewed in different directions with polarized light. As the solvent is evaporated, the molecules align themselves relative to direction of orientation of the surface on which they are supported with at least one axis parallel, and this orientation remains upon evaporation of the solvent. The resultant film has absorption for light vibrating in one direction and is transparent for light vibrating in a perpendicular direction, thereby producing a light polarizing filter.

In accordance with the present invention, it has been discovered that a gradient density polarizing filter can be produced by changing the concentration of the dichroic substance as it is applied to the transparent substrate from solvent solution. That is, it has been found that the light transmissive properties of the filter will vary with the concentration of the light polarizing molecules, and consequently by controlling the change in concentration as related to the surface area of the filter being formed, the light transmissive characteristics of a given filter can be materially changed. For example, 90 per cent transmission is effectively the maximum transmission when using a clear glass or plastic substrate, but by varying the concentration of the applied coating, the transmission properties can be readily reduced to 30 per cent, 40 per cent or to whatever extent is desired.

The direction of polarization of the filter is preferably controlled by the orientation of the surface of the transparent sheet to which the solution containing the dichroic substance is applied. Such surface may be conveniently oriented by rubbing the surface in the direction in which orientation is desired using, for example, a water slurry of rouge and a felt bar for the rubbing operation. The rouge is then washed off and the rubbed sheet dried, whereupon the sheet is positioned vertically or slightly inclined from the vertical and the dichroic substance in solvent solution is applied to the sheet by a suitable dispensing nozzle or the like arranged to progressively apply the solution along the uppermost edge of the sheet, the concentration of the dichroic substance being varied as the solution is being applied. The solution may be applied by a stationary nozzle, with the substrate advanced beneath it at a predetermined speed, or the nozzle may be moved relative to a stationary substrate. In either event, the concentration of the solution will be adjusted in accordance with the desired changes in density of the end product.

With the solution applied in the manner just described, it will be evident that the change in optical density may take place at any desired interval, and the rate of change may be constant, arithmatical, logarithmic or otherwise. While a filter produced in this manner will vary in optical density lengthwise of the substrate, it will be substantially uniform along any given vertical line. However, a variety of effects can be achieved by combining several such filters in a laminate with the variations in density arranged as desired.

DESCRIPTION OF THE DRAWINGS

FIG. 1 is a fragmentary elevational view of a gradient density polarizing filter made in accordance with the invention.

FIG. 2 is a vertical sectional view taken along the line 2—2 of FIG. 1.

FIG. 3 is a schematic elevational view of the formation of a filter in accordance with the invention.

FIG. 4 is a plan view of a first sheet to which a dichroic solution has been applied.

FIG. 5 is a second sheet to which the dichroic solution has also been applied.

FIG. 6 illustrates a laminate formed from the sheets illustrated in FIGS. 4 and 5.

DESCRIPTION OF THE PREFERRED EMBODIMENTS

Referring first to FIGS. 1 and 2, a gradient density polarizing filter in accordance with the invention comprises, in its simplest form, a transparent supporting sheet or substrate 1, preferably formed from clear glass or plastic although the substrate may be transparent, translucent, or tinted depending upon the end use of the product and the reflection characteristics desired. Similarly, the substrate may be rigid or flexible, again depending upon its intended use. The substrate carries a film 2 which comprises dichroic substance deposited on the substrate from a solvent solution. As will be evident from FIG. 1, the optical density of the film may vary. In the illustrated embodiment the filter is substantially clear, i.e., having maximum transmission along its right side, as indicated at 3, the density increasing and light transmission properties decreasing progressively from right to left, with the area of maximum optical density and minimum light transmission along the left edge of the filter, as indicated by the reference numeral 4. There is, however, no sharp line or step-like demarcation between adjoining areas of different optical densities; rather they blend or fuse together in what may be characterized as a smooth gradient.

In accordance with the invention, the surface of the substrate contacted by the dichroic substance is first oriented in the desired direction of orientation for the molecules of the dichroic substance. Thus, as diagrammatically illustrated in FIG. 1 by the double-headed arrows A, the surface of substrate 1 has been rubbed in a vertical direction, the arrows thus defining the direction of orientation of the molecules and hence the plane of polarization of the filter. This is the desired direction of orientation for an automobile visor to eliminate glare from a horizontal surface when a negative type dichroic substance is used. In this connection it should be pointed out that some dichroic substances orient with the electric vector of light absorbing axis parallel to the direction of rubbing of the substrate, whereas others oreint with the light absorbing axis perpendicular to the directions of rubbing. The latter type is said to have negative dichroism. Where the visor is intended for use with 45° polarized headlights, the angle of orientation would be at 45°, i.e., diagonally disposed.

In orienting the substrate, excellent results are obtained by merely rubbing the surface of the substrate on which the film is to be deposited, a water slurry of rouge and a felt bar being ideally suited for such purpose, although other materials may be used for the rubbing operation, inclusive of leather, cloth, or even paper. Following orientation, the rouge is washed away and the sheet dried, care being taken to avoid any wiping action which would interfere with the rubbed orientation of the sheet. In this connection, it will be understood that the substrate must comprise a material, such as glass or plastic, which will not absorb the dichroic solution. Substances which have a nematic liquid crystal phase will not polarize if they soak into the substrate; rather, the substrate must be such that the dichroic substance is adsorbed on its surface.

There are numerous dichroic substances and mixtures thereof which may be employed to practice the invention, inclusive of those set forth in the aforementioned U.S. Pat. Nos. 2,400,877 and 2,544,659. Such substances, in addition to being dichroic, must be capable of existing in the nematic liquid crystal state. Exemplary of these substances are the following:

| Name | New Color Index Number |
|---|---|
| Methylene Blue | 52015 |
| Napthal Yellow W | 10316 |
| Amaranth W | 16185 |
| Brilliant Yellow | 24890 |
| Diamond Black F | 26695 |
| Direct Blue 67 | 27925 |
| Basic Brown 4 | 21010 |
| Basic Blue 1 | 42025 |
| Bat Red 23 | 71130 |
| Solvent Blue 25 | 74350 |
| Direct Orange 8 | 34140 |

These materials, which may be characterized as "nematic" materials, can be brought into the nematic state by application from a solvent solution and the subsequent evaporation of the solvent. Numerous solvents may be utilized to provide a solution of the desired concentration, including methanol, acetone, ethyl alcohol, ethylene glycol, glycerin, acetin, water, and mixtures of such solvents. The choice will depend upon the particular dichroic substance or mixture of substances being used.

Illustrative examples of gradient density polarizing filters formed in accordance with the invention are as follows:

EXAMPLE I

A solution of Methylene Blue in menthanol when coated on a glass substrate produced the following results:

| % Concentration | % Transmission* |
| --- | --- |
| 3¾% | 32 |
| 3% | 40 |
| 2% | 43 |
| 1% | 50 |
| ½% | 70 |

EXAMPLE II

A solution comprising an equal proportion mixture of Diphenyl Fast Green GL and Direct Orange 8 in water when coated on glass produced the following results:

| % Concentration | % Transmission* |
| --- | --- |
| 5% | 24 |
| 4% | 33 |
| 3% | 43 |
| 2% | 49.5 |
| 1% | 56 |
| ½% | 62.5 |

*Measured by a Densichron Instrument

Mixtures may be prepared in which the dichroic material is admixed with a transparent material, such as ten brom-phenanthrene six sulphoric acid, and such materials also may be admixed with non-polariziing dyes, such as nigrosine, to impart a desired color or tint to the filter.

Referring next to FIG. 3, which diagrammatically illustrates apparatus for carrying out he invention, a metering device 5 is positioned to overlie the path of travel of the substrate 1a moving in the direction of the arrow B. The substrate will be mounted in a generally vertically disposed or upright position, preferably inclined slightly from the vertical, so that, as the substrate passes beneath the nozzle 6 projecting downwardly from the metering device 5, a solution of the dichroic material will be deposited on the substrate immediately adjacent its uppermost edge, the solution, indicated at 2a, flowing downwardly along the substrate so as to form a coating of substantially uniform thickness thereon. An excess of the solution will be employed to insure complete coverage of the substrate, with the excess collected in a drip pan 7 underlying the path of travel of the substrate. It will be understood, of course, that suitable conveying and guiding means will be provided to support and advance the substrate, which means may take diverse forms and does not constitute a limitation on the present invention.

The metering device 5, in the illustrative embodiment, is provided with a reservoir 8 for the dichroic substance and a reservoir 9 for the solvent. It will be understood that the dichroic substance in reservoir 8 will be in solvent solution, but in concentrated form, so that the concentration may be suitably cut by admixture with pure solvent from the reservoir 9. The metering device is provided with valve control means 10 and 11 operatively connected to the reservoirs 8 and 9, respectively, the valve control means serving to control the flow of materials from the reservoirs 8 and 9 for blending and discharge through the common nozzle 6. The metering device also may be provided with a controller, indicated at 12, for automatically adjusting the concentration of the blended materials and the duration of flow at any given concentration. Thus, as the substrate to be coated passes beneath the metering device at a given rate of speed, the controls may be set to provide the desired concentration of the solution being applied to predetermined portions of the substrate.

Following application of the coating to the substrate the coating will be dried, the drying being accomplished in various ways already known in the art of drying film. Thus, the coated substrate may be passed through a suitable drying chamber wherein drying may be accomplished by flowing a constant stream of dry gases over the coated surface. Best results are obtained when the drying occurs in a uniform countercurrent flow of gases; and the drying may be heat forced after the point of solidification is reached. Various drying and hardening techniques are taught in the aforesaid U.S. Pat. Nos. 2,400,877 and 2,481,830, and it is to be understood that the drying of the coating and its after-treatment, inclusive of the use of protective lacquer coating on the lamination of the coated substrate with a glass or plastic sheet, do not constitute limitations on the present invention, the essential consideration being the controlled change in the concentration of the coating as it is applied to the substrate.

It is important that the coating is not physically disturbed during drying since orientation of the dye molecules relative to the rubbed surface of the substrate takes place as the dichroic substance passes through its liquid crystal phase, and if the orientation of the molecules is disturbed, the polarization of the dried film will be spoiled. It is also to be understood that while the dichroic solution as applied to the substrate is in the form of a relative thin coating of substantially uniform thickness, upon evaporation of the solvent there remains only the dye itself, which is in the form of an extremely thin film having a thickness which varies in accordance with the concentration of the dye in the solvent solution. By way of example, the thickness of the dried film will vary from about 16 microns down to literally zero microns, depending upon the concentration of dye in the solvent solution applied to any given area of the substrate; the more dilute the applied solution, the less the concentrations of the dye and the thinner the dried coatings.

Modifications may be made in the invention without departing from its spirit and purpose. For example, while in the embodiment illustrated the substrate to be coated is advanced in the path of travel beneath a fixedly positioned metering device, it will be readily apparent that the metering device itself may be mounted for movement relative to a stationary substrate. Thus, the metering device would be mounted for movement in a horizontal path along the length of the substrate, with the controls and timing mechanism set to vary the concentration of the solution in accordance with the density requirements of the filter being formed.

It will also be understood that while the optical density of individual filter elements will be linear in the sense that gradiations will occur only in one direction, i.e., horizontally of the substrate, whereas the density will be essentially uniform from top to bottom along any given vertical line, diverse effects can be achieved by combining two or more filter elements. For example, where variations in density are desired both vertically and horizontally, two elements may be laminated together with the density of one element varying in a horizontal direction and the density of the other extending element varying in a vertical direction. Thus, as illustrated in FIG. 4, a sheet 13 may be formed having a direction of rubbed orientation extending in the direction of the Arrow C and with areas of maximum concentration along its opposite side edges, as indicated at 14 and 15, the concentration tapering off through the central portion 16 of the sheet. A mating sheet 17 is shown in FIG. 5, the sheet having its direction of orientation extending in the direction of the Arrow D, with areas of maximum concentration at 18 and 19, the concentration tapering off toward the intermediate area 20 of minimum concentration. When the two sheets are juxtaposed to form a laminate, as illustrated in FIG. 6, a filter is provided having peripheral areas of greater density, as defined by the area 14, 15, 18 and 19 and a center area of minimum density, as defined by the juxtaposed minimum areas 16 and 20.

In the laminated filter just described, the areas adjacent the four corners of the laminate will be of maximum density due to the fact that the corners encompass the areas of maximum concentration in both sheets, but by controlling and balancing the concentrations of dichroic substances on each sheet, the desired light transmission characteristics can be achieved in the laminated product. As should be evident, by selecting and arranging both the concentration of the coatings and the direction of orientation of the individual sheets, filters may be produced having a wide and diversified range of density effects. In a laminated filter structure, the direction of orientation of the several substrates may be the same, or their directions may be mixed. For example, in a visor for use in a subway or other application where there are undesirable reflections from the sides as well as from above and below, and yet clear visibility is required straight ahead, the directions of orientation of the substrates will be angularly disposed relative to each other to provide the desired glare control.

The embodiments of the invention in which an exclusive property or privilege is claimed ar defined as follows:

1. A process for producing a gradient density light transmissive filter wherein a solvent solution of dichroic substance capable of existing in the nematic liquid crystal phase is applied to the directionally oriented surface of a light transmissive substrate to form a light transmissive film thereon, the substrate being non-absorptive with respect to the solvent solution, the improvement which comprises the step of changing the concentration of the dichroic substance in the solvent solution as it is applied to different portions of the substrate, whereby to vary the optical density of the film being formed in accordance with a predetermined pattern, and thereafter drying the applied solution to evaporate the solvent and thereby form a discrete film on the oriented surface of the substrate which consists essentially of said dichroic substance.

2. The process claimed in claim 1 wherein said solvent solution contains a single dichroic substance.

3. The process claimed in claim 1 wherein said solvent solution contains a mixture of dichroic substances.

4. The process claimed in claim 1 wherein said solvent solution includes a non-polarizing die.

5. The process claimed in claim 1 including the steps of forming a plurality of substrates each having a dried film of dichroic substance defining a different predetermined density pattern, and juxtaposing said substrates to form a laminated filter having a density pattern which is a composite of the density patterns of the films carried by the individual substrates.

6. In a process for producing a gradient density light transmissive filter wherein a solvent solution of a dichroic substance capable of existing in the nematic liquid crystal phase is applied to a directionally oriented surface of a light transmissive substrate to form a light transmissive film thereon, the substrate being non-absorptive with respect to the applied solvent solution, the improvement which comprises the steps of:

positioning the substrate in an essentially upright position, applying the solvent solution progressively along the uppermost edge of the directionally oriented surface of the substrate in a quantity sufficient to flow downwardly to completely cover the said surface of the substrate, including the step of changing the concentration of the dichroic substance in the solvent solution as the solvent solution is being progressively applied to the substrate, whereby to vary the optical density of the film being formed in accordance with changes in the concentration of the dichroic substance, and thereafter evaporating the solvent from the applied solution to form a film consisting essentially of said dichroic substance.

7. The process claimed in claim 6 including the step of providing an applicator for applying the solvent solution to the substrate, and progressively applying the solution to the substrate by effecting relative movement between the substrate and the applicator.

8. The process claimed in claim 6 including the step of moving the substrate in a horizontal path of travel, and applying the solvent solution from a fixed point overlying the path of travel of the substrate.

9. The process claimed in claim 7 including the step of maintaining the substrate in a stationary position during the application of the solvent solution, and moving the applicator for applying the solvent solution in a horizontal path of travel overlying and following the upper edge of the substrate.

10. A gradient density light transmissive filter comprising a light transmissive substrate having a directionally oriented surface, a light transmissive film on the directionally oriented surface of the substrate, said film consisting of dichroic substance having a nematic liquid crystal phase, the optical density of the dichroic substance varying in a smooth gradient from area to area of said substrate in a predetermined density pattern, the substrate being non-absorptive with respect to the dichroic substance, said film being characterized by having been formed by applying a solvent solution of the dichroic substance to the substrate in a coating of substantially uniform thickness in which the concentration of the dichroic substance is varied from area to area in accordance with the predetermined density pattern and the applied coating dried to eliminate the solvent, the optical density of the dry film directly corresponding to the concentration of the solvent solution.

11. The gradient density filter claimed in claim 10 wherein said filter comprises at least two juxtaposed substrates each having a dichroic film defining a different optical density pattern, the optical density of the filter comprising a composite of the optical density patterns of the juxtaposed substrates.

12. The gradient density filter claimed in claim 11 wherein the directionally oriented surfaces of the juxtaposed substrates are parallel.

13. The gradient density filter claimed in claim 11 wherein the directionally oriented surfaces of the juxtaposed substrates are angularly disposed relative to each other.

14. The gradient density filter claimed in claim 10 wherein the light transmissive film is composed of a mixture of dichroic substances.

* * * * *